Patented Sept. 24, 1940

2,215,846

UNITED STATES PATENT OFFICE 2,215,846

AMYLACEOUS COMPOSITION

Hans F. Bauer, Chicago, Ill., assignor to Stein, Hall Manufacturing Company, Chicago, Ill., a corporation of Delaware No Drawing. Application June 24, 1936,
Serial No. 87,015

11 Claims. (Cl. 134—23.4)

This invention relates to new and improved amylaceous compositions, more particularly new and improved film-forming compositions which have adhesive properties, and a process for the preparation thereof. The invention further relates to dry base compositions which upon the addition of water give film-forming compositions.

It is well known that starch or derivatives of starch, e. g., dextrins, which are herein generically referred to as amylaceous materials, have been widely used for the preparation of compositions suitable for laundry use, adhesive preparations, and a wide variety of other purposes.

It is an object of the present invention to produce new and improved amylaceous compositions having a wide variety of uses, and which are especially useful as adhesives. A further object is to produce new and improved film-forming compositions containing starch or starch derivatives. An additional object is to produce amylaceous compositions which are strong adhesives and are especially useful in the more difficult type of adhesive applications, as for instance in making envelopes of bond paper. Another object is the preparation of materials having thereon a film or coating of amylaceous compositions of the character herein described. Other objects are the preparation of an amylaceous composition which will produce films that are clear, do not check or crack, will not discolor, do not tend to crystallize, and are slightly hygroscopic. Other objects of the invention will appear as the description proceeds.

In accordance with the invention it has been found that new and useful amylaceous compositions may be prepared by bringing together starch or starch derivatives, a urea and water. While urea has heretofore been used more or less incidentally in the treatment of starch or flour, and has been used in relatively small amounts in conjunction with other substances, such as oxidizing agents, in making starch glues, it has now been found in practicing the present invention that very satisfactory film-forming amylaceous compositions useful as adhesives and for other purposes may be prepared from starch or starch derivatives, water and urea as essential ingredients, and without oxidizing agents, provided relatively large quantities of urea are employed. The compositions of this invention are desirably prepared for commercial use and shipment in the form of dry base compositions which yield film-forming compositions upon the addition of water. The quantities of urea are preferably at least such as to gelatinize the starch or starch derivative in the presence of water by mixing under ordinary temperature and pressure conditions.

The mixing operation may be carried out in any convenient manner, for example, in a vessel provided with a stirrer. As the mixing proceeds the urea appears to exert a wetting action on the starch or derivative thereof, causing it to become more or less clear and gelatinous. At the same time the mixing vessel becomes quite cold. With limited quantities of water, for example, 25% by weight of the mixture, the mixture at first becomes very viscous and then more fluid as the mixing is continued or as the mixture is allowed to stand. The addition of urea and/or water may be made to increase the fluidity of the mixture as desired.

Auxiliary agents may be added to the amylaceous compositions for various purposes. Thus, in preparing envelope glues it is usually desirable to add a substance to the mixture which is adapted to inhibit or prevent the crystallization of urea and which will give the dry film formed from the resultant composition a glossy appearance.

The invention will be further illustrated, but is not limited, by the following examples in which the quantities are stated in parts by weight:

Example I

A starch composition was prepared by mixing together 55.5 parts of Hercules starch, which is a chlorinated and thin-boiling corn starch bearing the trade name "Hercules" (which takes up about three parts of water), 44.5 parts of urea and 72 parts of tap water, at the ordinary temperature of the room which was about 70° F. The mixture became quite cold. As the mixing was continued for 10 to 15 minutes, the starch appeared to gelatinize and the mixture became more viscous. Upon being allowed to stand overnight, it became more fluid. The resultant product was a white paste which gave films on glass and paper that did not check or crack. These films were not glossy, but possessed excellent adhesive properties when moistened with water, and were found to be very useful in making envelopes from bond paper.

Example II

A starch composition was prepared by mixing together 55.5 parts of Hercules starch, 22.2 parts of urea, 33.3 parts of sodium acetate and 72 parts of water, until the starch had gelatinized into a paste. The mixing was carried on at a temperature of 180° F. in order to accelerate the gelatinization.

The resultant composition was a white paste at ordinary temperatures and gave clear films on glass and paper. The sodium acetate apparently tends to prevent crystallization of any of the components of the mixture and imparts a gloss to the film. Compositions of this type are especially useful as adhesives on the rear flaps of envelopes where it is desirable that the adhesive appear in glossy form. The adhesive composition when applied to bond paper, other types of paper, glass and other materials gave clear, glossy films which did not tend to check or crack. When bond paper containing one of these films which had been previously dried was moistened with water and pressed against another piece of such paper, excellent adhesion of paper to paper was obtained.

Example III

Fifty (50) parts of Hercules starch, 30 parts of urea, 20 parts of cane sugar and 65 parts of water were mixed together at an ordinary temperature of about 60° to 80° F. until gelatinization of the starch occurred, and the product was obtained as a soft paste. This product gave results similar to those described in Example II.

Example IV

A composition was prepared by mixing together 55.5 parts of Hercules starch, 22.3 parts of urea, 22.2 parts of sodium acetate and 72 parts of water, at a temperature of 165° to 180° F., for about five minutes. The resultant composition was a white fluid substance having properties of gloss and adhesion similar to those described in Example II.

Example V

A composition was prepared by mixing together 20.5 parts of urea, 10.5 parts of sodium acetate, 68 parts of white tapioca dextrin about 40% to 45% water soluble, 1 part of sodiumbisulfite, and 41 parts of water, at a temperature of 165° F. A fluid mixture having good adhesive properties was obtained.

Example VI

A composition was prepared by mixing together 18.5 parts of urea, 6 parts of sodium acetate, 15 parts of tapioca dextrin of the type described in Example V, 60 parts of a highly soluble light yellow tapioca dextrin capable of taking up about 0.6 part of water per part of dextrin, 0.5 part of sodium bisulfite and 30 parts of water. This mixture was heated at 165° F. until a gelatinous composition of fluid consistency was obtained. The product possessed good glue and adhesive properties.

In the following examples various compositions were prepared to determine the effect of auxiliary agents upon the products, and also to determine the effect of varying the proportions of materials:

Example VII

The following compositions were prepared by mixing together the ingredients shown in the various columns listed below:

| | Hercules starch | Dextrine* | Urea | Sodium acetate | Water | Characteristics of product | | |
|---|---|---|---|---|---|---|---|---|
| | | | | | | Gloss | Fluidity | Coating |
| 1 | 50 | 80 | 50 | 20 | 60 | Gloss | Does not flow | Good. |
| 2 | 40 | 80 | 50 | 20 | 60 | Good gloss | do | Do. |
| 3 | 30 | 80 | 50 | 20 | 60 | Gloss | do | Fair. |
| 4 | 20 | 80 | 50 | 20 | 60 | Slight gloss | Flows some | Thin. |
| 5 | 10 | 80 | 50 | 20 | 60 | None | Flows freely | Do. |
| 6 | 15 | 80 | 50 | 20 | 60 | Slight | do | Do. |

*A white corn dextrin product which is about 25% to 30% water soluble.

These compositions were all prepared by mixing the ingredients at room temperature for about ten to fifteen minutes until a homogeneous gelatinous mass was obtained and then allowing them to stand overnight.

The consistency of these compositions was observed at regular intervals for two weeks. Compositions 1, 2 and 3 were too heavy to flow at all times. Composition 4 would barely flow at room temperature of 72° F. for the first six days and after standing for two weeks would not flow. Composition 5 flowed freely, spread very freely and penetrated more than the others of the series. Composition 6 flowed freely and spread easily.

Strips of bond paper (made from 100% rag) were sealed together with each of the six compositions and left in an oven at a temperature of 210° F. for 96 hours. All of the seals were colorless and had firm bonds. Films of the composition were dried at room temperature upon glass. The gloss effect was determined by allowing the compositions to dry on bond paper for 24 hours.

Example VIII

The following compositions were prepared by mixing together the ingredients shown in the various columns listed below:

| | Hercules starch | Dextrine* | Urea | Sodium monophosphate | Water | Characteristics of product | |
|---|---|---|---|---|---|---|---|
| | | | | | | Gloss | Fluidity |
| 1 | 30 | 80 | 50 | 20 | 60 | Dull | Does not flow. |
| 2 | 30 | 80 | 50 | 24 | 60 | do | Do. |
| 3 | 30 | 80 | 50 | 10 | 60 | Slight | Do. |
| 4 | 30 | 80 | 50 | 15 | 60 | do | Do. |

*Same as in Example VII.

The compositions were prepared according to the procedure of Example I and the tests for gloss and fluidity were similar to those of Example I. Films of the compositions dried on watch glass showed no crystallization after a week. Strips of standard bond paper sealed with these compositions and dried as in Example I for 96 hours had good bond and showed no yellow discolorations.

Example IX

The following compositions were prepared by mixing together the ingredients shown in the various columns listed below:

| | Hercules starch | Dextrine* | Urea | Sodium acetate | Water |
|---|---|---|---|---|---|
| 1 | 10 | 80 | 34 | 20 | 60 |
| 2 | 10 | 80 | 34 | 10 | 60 |

*Same as in Example VII.

These compositions were prepared in a manner similar to that described in Example VII. Composition 1 flowed freely and spread easily. Composition 2 flowed after six days, but did not flow after standing for two weeks. Films of both compositions on glass were tough but not as hard or crystalline as the compositions of Example VII. Strips of standard bond paper sealed with these compositions as in Example VII had a good bond after being in the oven for 96 hours.

Example X

The following compositions were prepared by mixing together the ingredients shown in the various columns listed below:

| | Hercules starch | Dextrine* | Urea | Ammonium chloride | Citric acid | Water | Characteristics of product, fluidity |
|---|---|---|---|---|---|---|---|
| 1 | 10 | 80 | 34 | 19 | 1 | 60 | Flows freely. |
| 2 | 10 | 80 | 34 | 10 | 0.5 | 60 | Flows. |
| 3 | 10 | 80 | 34 | 20 | 0 | 60 | Flows freely. |
| 4 | 20 | 80 | 50 | 19 | 1 | 60 | Flows, spreads well. |
| 5 | 20 | 80 | 34 | 19 | 1 | 60 | Does not flow. |
| 6 | 20 | 80 | 34 | 19 | 1 | 70 | Flows. |

*Same as in Example VII.

These compositions were prepared by mixing together the ingredients as in Example VII and tests were similarly conducted. All of the compositions flowed except No. 5 which was too heavy to flow even when hot. The entire series of compositions produced only a slight gloss on bond paper after drying 24 hours. Films on glass made with this series showed a needle-like crystallization. Composition 4 had much larger crystals than the others. Crystal formation, however, did not destroy adhesion. All of the films showed a decided tendency to be hygroscopic in relatively high humidities. Strips of standard bond paper sealed with compositions of this series and dried as in Example VII for 96 hours had a very firm bond.

Example XI

The following compositions were prepared by mixing together the ingredients shown in the various columns listed below:

| | Hercules starch | White tapioca dextrin* | Urea | Sodium acetate | Water | Characteristics of product, fluidity |
|---|---|---|---|---|---|---|
| 1 | 50 | 80 | 50 | 20 | 60 | Flows. |
| 2 | 40 | 80 | 50 | 20 | 60 | Flows easily. |
| 3 | 30 | 80 | 50 | 20 | 60 | Flows freely. |
| 4 | 20 | 80 | 50 | 20 | 60 | Flows easily. |

*35.1% soluble in water.

These compositions were prepared by mixing the foregoing ingredients as in Example VII. Composition 1 flowed but was more difficult to spread than the compositions of Example X. Composition 2 was easier to spread than composition 1. Composition 3 spread very easily. The entire series produced a good gloss when dried on standard bond paper for 24 hours. Films made on glass could be scratched with the finger nail and showed pearl-like crystallization. However, a good film was obtained. Strips of bond paper sealed with compositions of this series and dried in a steam-heated oven for 96 hours had a very good bond.

Example XII

The following compositions were prepared by mixing together the ingredients shown in the various columns listed below:

| | Hercules starch | White tapioca dextrin* | Urea | Sodium acetate | Water | Characteristics of product, fluidity |
|---|---|---|---|---|---|---|
| 1 | 50 | 80 | 34 | 20 | 60 | Flows well. |
| 2 | 50 | 80 | 34 | 10 | 60 | Barely flows. |
| 3 | 40 | 80 | 34 | 10 | 60 | Flows. |
| 4 | 40 | 80 | 34 | 5 | 60 | Do. |
| 5 | 30 | 80 | 34 | 10 | 60 | Do. |
| 6 | 40 | 80 | 25 | 10 | 60 | Does not flow. |

*35.1% soluble in water.

These compositions prepared as in Example VII showed the effect of using less urea and sodium acetate. Compositions 1 to 5 flowed. However, composition 2 barely flowed after six days and did not flow after standing 10 days. Composition 6 did not flow at 82° F. All of these compositions made good transparent films on glass with no decided crystallization. Films of the compositions made on standard bond paper and dried for 24 hours all had a good gloss except No. 6 which had only a fair gloss and a tendency to check. Strips of bond paper sealed with compositions of this series and dried in a steam oven for 96 hours had good bonds and showed no discoloration.

Example XIII

The following compositions were prepared by mixing together the ingredients shown in the various columns listed below:

| | Hercules starch | White tapioca dextrin* | Urea | Ammonium chloride | Citric acid | Water | Characteristics of product, fluidity |
|---|---|---|---|---|---|---|---|
| 1 | 10 | 80 | 34 | 19 | 1 | 60 | Thin. |
| 2 | 20 | 80 | 34 | 19 | 1 | 60 | Do. |
| 3 | 10 | 80 | 34 | 20 | 0 | 60 | Flows very freely. |
| 4 | 20 | 80 | 50 | 10 | 1 | 60 | Flows. |
| 5 | 20 | 80 | 34 | 19 | 0 | 60 | Do. |
| 6 | 20 | 80 | 34 | 19 | 1 | 50 | Do. |
| 7 | 40 | 80 | 34 | 19 | 1 | 60 | Flows, good body. |
| 8 | 50 | 80 | 34 | 19 | 1 | 60 | Flows. |

*35.1% water soluble.

This series of compositions was made to learn the effect of using ammonium chloride and citric acid instead of sodium acetate and white tapioca. The compositions were prepared according to the procedure of Example VII. Films of the compositions dried on glass gave a needle-like crystallization similar to those of Example X. Composition 8 gave a film showing small grain-like crystals after standing for a week. Strips of standard bond paper sealed with this series had good bonds.

*Example XIV*

The following compositions were prepared by mixing together the ingredients shown in the various columns listed below:

| | Hercules starch | White tapioca dextrin* | Urea | Corn sugar | Water | Citric acid | Characteristics of product, fluidity |
|---|---|---|---|---|---|---|---|
| 1 | 50 | 80 | 50 | 20 | 60 | 0 | Does not flow. |
| 2 | 50 | 80 | 50 | 10 | 60 | 0 | Flows. |
| 3 | 50 | 80 | 50 | 20 | 60 | 2 | Flows easily. |
| 4 | 50 | 80 | 50 | 20 | 60 | 1 | Do. |
| 5 | 50 | 80 | 34 | 20 | 60 | 1 | Does not flow. |
| 6 | 50 | 80 | 34 | 10 | 60 | 1 | Do. |

*35.1% water soluble.

These compositions were prepared by the procedure of Example VII. Films dried on glass did not crystallize but had a tendency to be hygroscopic. Strips of standard bond paper sealed with compositions of this series and dried in a steam oven for 96 hours had a good bond. Films of the compositions made on bond paper and dried for 24 hours had a fair gloss.

*Example XV*

The following compositions were prepared by mixing together the ingredients shown in the various columns listed below:

| | Hercules starch | White tapioca dextrin* | Urea | Cane sugar | Water |
|---|---|---|---|---|---|
| 1 | 50 | 80 | 50 | 20 | 60 |
| 2 | 50 | 80 | 50 | 10 | 60 |
| 3 | 50 | 80 | 34 | 20 | 60 |

*35.1% water soluble.

These compositions were prepared by the procedure of Example VII. Compositions 1 and 2 did not flow. Composition 3 flowed immediately after it was made. However, on standing 24 hours it did not flow. Strips of bond paper sealed with compositions of this series and dried in a steam oven for 96 hours had a good bond. Films dried on glass did not crystallize.

*Example XVI*

A composition was prepared by mixing together 40 parts of Hercules starch, 80 parts of a 25% to 30% water soluble white corn dextrin, 50 parts of urea, 10 parts of calcium chloride and 60 parts of water, for 10 to 15 minutes, at room temperature. This composition was allowed to stand over night and was then tested. It showed good adhesive properties.

*Example XVII*

A composition was prepared by mixing together 40 parts of Hercules starch, 80 parts of white tapioca dextrin (35.1% water soluble), 50 parts of urea, 10 parts of corn sugar, 10 parts of calcium chloride, and 60 parts of water. This composition showed good adhesive properties, particularly for paper. It did not flow after standing a week. Films on glass did not crystallize.

It will be apparent that modifications may be made in the preparation of the material and in the use of auxiliary agents in preparing compositions of the type herein described. As previously indicated, by an amylaceous substance it is intended to include starch or starch derivatives, for example, colloidal modifications of starch. A colloidal modification of starch here means a derivative of starch, whether by hydrolysis, oxidation, heat or enzymatic actions. The dextrins may be derivatives of a single type of starch, or derivatives of a blend of starches, or blends with diverse starches. Likewise, a composition may contain both starch and dextrin. In general the preferred compositions contain some starch, but compositions may be prepared having a part or all of the starch replaced by a colloidal modification of starch, e. g., a dextrin, less water being required in the preparation of the composition of the desired fluidity where dextrin is used in place of starch. It is preferable to employ a modified starch capable of taking up about 2 to 3 parts of water per part of starch.

While the best results have been obtained in the use of urea $(CO(NH_2)_2)$ as the gelatinizing agent, it will be understood that other ureas, preferably having a similar action, may be employed to replace urea, wholly or in part, in preparing amylaceous compositions in accordance with the present invention. Hence the expression "a urea" is herein employed to cover substituted ureas, e. g., monomethylurea, monoethylurea, symmetrical dimethylurea, and higher homologues, as well as analogues, e. g., thiourea. The results with ureas other than urea itself, however, may vary rather widely.

The proportion of the urea is subject to variation, but it is preferable to employ at least 25% of urea based upon the total weight of starch, or starch derivative, and urea. Larger amounts may be employed, the upper limit being governed usually by the amount of urea which may be added without crystallizing out of solution. In general, it is preferable to employ 25% to 50% of urea based upon the total weight of the starch, or starch derivative, and urea. The lower limit of the amount of urea is that amount which will produce a gelatinous product at ordinary temperatures, as distinguished from a hard solid which cannot readily be applied and cannot be flowed into films. If desired, a base material may be prepared by merely mixing together the urea and starch, or starch derivative, with or without the application of heat. This material when treated with water then forms a glue composition. Compositions prepared by merely mixing together the urea and starch, or starch derivative, are especially suitable for shipment as such.

The amount of water may vary somewhat, depending largely upon the nature and proportions of the other ingredients. For example, with larger quantities of urea, less water is usually required. Likewise the amount of water required will vary with the type of starch or starch derivatives. Usually less water is required with dextrins than with starches. In general, it is preferable to use as little water as possible to obtain the desired fluidity and film-forming characteristics. Compositions have been prepared with as low as 25% water based upon the total weight of urea and starch or starch derivative, but much larger quantities of water may be employed, depending upon the purpose for which the composition is prepared. Thus the water content may vary within the range of 25% to 75% by weight of the dry base, that is, starch or starch derivative plus urea. Compositions have been prepared in which the ratio of dry base to water was 1:1. All of the water may be added together with the starch or starch derivative and urea when the mixing is begun, or it may be added gradually during the mixing operation.

With the larger quantities of urea employed in accordance with this invention it is possible to effect the mixing operation at ordinary temperatures. However, this may be accelerated somewhat by using elevated temperatures, that is, temperatures above about 80° F., and within the range of 160° to 180° F. Higher or lower temperatures may be used but the temperature should be below the decomposition temperature of the urea. Atmospheric, subatmospheric or superatmospheric pressures may be employed.

It will be recognized that the time of mixing will vary, depending upon the size of the batch and the efficiency of the apparatus. Usually the mixing is effected until a homogeneous gelatinous product is obtained. For example, this may require mixing for 10 to 15 minutes and then allowing the product to stand over night.

The compositions consisting solely of starch, or a starch derivative, urea and water form films which are white or dull rather than glossy, apparently due to the formation of urea crystals. This is not detrimental to the adhesive action of the film but where the film is applied to the open flap of envelopes to be sealed by the user it is normally desirable that the adhesive surface present a glossy appearance. In preventing urea crystallization a number of water soluble compounds may be used, as illustrated by the salts and sugars disclosed in the examples. In general, it is preferable to include in the composition an alkali metal acetate, for example, sodium acetate or potassium acetate, or an acid phosphate, for example, sodium monophosphate. These preferred materials have the dual function of preventing urea crystallization and producing a glossy film. The amounts used are normally sufficient for that purpose, preferably corresponding to about 5% to 20% by weight of dry base (i. e., starch, or starch derivative and urea). Salts used as addition agents are preferably neutral, weakly alkaline, or weakly acidic. In general, the addition agents are preferably slightly hygroscopic in character or are preferably used in sufficient amounts to make the resultant composition slightly hygroscopic.

Other substances which may be added to the mixture of amylaceous material and urea, either before or after mixing with water, are auxiliary gelatinizing agents, wetting and dispersing agents, neutralizing agents, bleaching agents, fillers and pigments. The resultant mixture may contain one of such substances or any combination thereof. As examples of addition agents which appear to have a gelatinizing action may be mentioned resorcinol, chloral hydrate, sodium salicylate, calcium chloride, zinc chloride, magnesium chloride and potassium acetate. Examples of bleaching agents are sodium bisulfite and sodium hydrosulfite. These are especially desirable where the compositions are slightly dark in color. Fillers may be used to give body to the product. Examples are clay, bentonite, and the like.

In applying the compositions of the invention for adhesive purposes, the composition may be spread on the surface of the material to be glued, for example, paper, at ordinary temperatures, and sealed; or heat and pressure may be used, for instance by sealing together the surfaces with adhesive composition between them and drying by means of a current of air which may be hot or cold. Potentially adhesive surfaces may be formed by coating the surface of the paper or other material (e. g., cloth, wood, metal, fibrous sheet materials, and the like) with the composition and drying the coating. These surfaces are adhesive when moistened.

The compositions of the invention may be used in coating, impregnating, and sizing fibrous sheet materials, including all types of paper, cloth and similar materials. Likewise, they may be used in coating wood, glass and metal in sheet form, e. g., cans. Good results are obtained in gluing varnished labels on cans with these compositions. They may also be used in making tight-wrapped boxes without warping.

The invention has the advantage of providing new and improved compositions which are cheaply and readily available and at the same time possess good adhesive strength. Firm adhesion is obtained with bond paper which is more difficult to seal than most papers. Furthermore, the adhesive compositions of this invention are cold water pastes. They may be prepared by mixing the ingredients at ordinary temperatures and may be applied at such temperatures.

It will be apparent from the foregoing description that I use the term "gelatinized" in the sense of dispersing the starch to form a more or less clear, gelatinous product in water.

Insofar as I am aware, it has not heretofore been known that a film-forming composition of high adhesive strength could be obtained from starch, or a starch derivative, urea and water by employing sufficiently large amounts of urea to gelatinize the starch (or derivative) in the presence of water under ordinary temperature and pressure conditions. Smaller amounts of urea, say 10%, are not sufficient to produce the desired gelatinization of starches at ordinary temperatures. When heated with the starch, or starch derivative, with or without water, such small amounts of urea either do not produce a suitable film-forming material or give a composition of comparatively poor adhesive qualities.

It will be understood that the expression "a starch" is intended to include and cover undegenerated and degenerated starches, e. g., raw starch and modified starches, which exhibit the usual starch reactions, as distinguished from dextrins which do not give the blue iodine reaction of starch and which disperse readily in cold water to form solutions or hydrosols.

Having thus described the invention, what I claim as new and desire to secure by Letters Patent of the United States is:

1. A gelatinized starch composition of strong adhesive properties, said composition containing a starch as substantially the sole bonding agent and a water soluble urea in amount from about 25% to about 50%, based on the total weight of starch and urea.

2. A gelatinized starch composition of strong adhesive properties, said composition containing a starch as substantially the sole bonding agent, urea in amounts from about 25% to about 50% by weight of the starch and urea, and water in a weight ratio to normally solid ingredients less than about 1:1.

3. A gelatinized starch composition of strong adhesive properties, said composition comprising a starch, about 25% to about 50% urea, and about 25% to about 75% water, said percentages being based upon the total weight of starch and urea, said starch being substantially the sole bonding agent in said composition.

4. A dry adhesive base composition adapted to form a gelatinous adhesive film-forming dispersion upon the addition of water, said base composition containing a starch as substantially the sole bonding agent and a water soluble urea in amounts corresponding from about 25% to about 50% by weight of the total starch and urea.

5. A gelatinized starch composition of strong adhesive properties, said composition containing as the normally solid ingredients a major proportion of a starch, a minor proportion of urea but in excess of about 25% of the total starch and urea and a minor proportion of a water soluble, normally solid, slightly hygroscopic, normally crystalline material in sufficient amount to reduce the whitening and pattern effect of the urea and to clarify and impart gloss to dried films of said compositions, the bonding agents in said composition being selected substantially solely from amylaceous substances.

6. A gelatinized starch composition of strong adhesive properties, said composition consisting of a starch, about 25% to about 50% of urea based upon the total weight of starch and urea, and a minor proportion of a water-soluble, normally solid, slightly hygroscopic, normally crystalline material adapted to reduce the whitening and pattern effect of the urea and to clarify and impart gloss to dried films of said composition.

7. A gelatinized starch composition of strong adhesive properties, said composition containing a major proportion of a starch, about 25% to about 50% of urea and a minor proportion of ammonium chloride.

8. A remoistening adhesive formed from a gelatinized starch intimately dispersed with about 25% to about 50% of urea.

9. A remoistening adhesive formed from a gelatinized starch intimately dispersed with about 25% to about 50% of a water soluble urea and a minor proportion of a water soluble, normally solid, slightly hygroscopic, normally crystalline substance in amount sufficient to inhibit the crystallization of urea in dried films of said adhesive.

10. An amylaceous composition of strong adhesive properties, said composition containing an amylaceous substance as substantially the sole bonding agent, and a water soluble urea in amount from about 25% to about 50% based on the total weight of amylaceous substance and urea.

11. An amylaceous composition of strong adhesive properties, said composition containing a mixture of a starch and a dextrine as substantially the sole bonding agents, and a water soluble urea in amount from about 25% to about 50% based upon the total weight of starch, dextrine and urea.

HANS F. BAUER.